United States Patent
Yoda

(10) Patent No.: US 6,564,163 B2
(45) Date of Patent: May 13, 2003

(54) CALCULATION DEVICE AND METHOD THEREFOR

(75) Inventor: Kiwamu Yoda, Osaka (JP)

(73) Assignee: Oki Electric Industry CO, Ltd., Tokyo (JP)

(*) Notice: Subject to any disclaimer, the term of this patent is extended or adjusted under 35 U.S.C. 154(b) by 0 days.

(21) Appl. No.: 09/794,622

(22) Filed: Feb. 28, 2001

(65) Prior Publication Data

US 2001/0044703 A1 Nov. 22, 2001

(30) Foreign Application Priority Data

Mar. 29, 2000 (JP) ........................................ 2000-090841

(51) Int. Cl.$^7$ ............................................... G06F 15/00
(52) U.S. Cl. ....................................... 702/130; 702/132
(58) Field of Search ................................. 702/130, 132, 702/136, 99; 700/28, 30, 32–34; 374/44

(56) References Cited

U.S. PATENT DOCUMENTS 5,511,012 A * 4/1996 Deville ........................ 702/109
5,726,880 A * 3/1998 Bailey et al. ................. 700/72
6,132,083 A * 10/2000 Enala .......................... 374/44

FOREIGN PATENT DOCUMENTS

JP        07056894 A        3/1995

* cited by examiner

Primary Examiner—Bryan Bui
(74) Attorney, Agent, or Firm—Rabin & Berdo, P.C.

(57) ABSTRACT

A calculation device includes a memory for storing a plurality of values of thermo-couple input temperature calculated using a plurality of values of thermo-couple output electrical potential and a plurality of values of surrounding temperature; and a calculation unit for inputting a value of thermo-couple output electrical potential and a value of surrounding temperature, reading from the memory a plurality of values of stored thermo-couple output electrical potential corresponding to the inputted thermo-couple output electrical potential, reading from the memory a plurality of values of stored surrounding temperature corresponding to the inputted surrounding temperature, reading from the memory a plurality of values of stored thermo-couple input temperature corresponding to the read values of the thermo-couple output electrical potential and the read values of surrounding temperature, and calculating by interpolation the thermo-couple input temperature corresponding to the inputted surrounding temperature and the inputted thermo-couple output electrical potential.

8 Claims, 7 Drawing Sheets

| THERMO-COUPLE INPUT TEMPERATURE z[°C] | | THERMO-COUPLE OUTPUT x[V] | | | | | | | | |
|---|---|---|---|---|---|---|---|---|---|---|
| | | 0 | 0.007 | 0.013 | 0.018 | 0.022 | 0.027 | 0.033 | 0.04 | 0.048 |
| SURROUNDING TEMPERATURE y[°C] | -20 | -20.00 | 44.62 | 79.22 | 101.81 | 117.32 | 134.43 | 152.47 | 170.98 | 189.63 |
| | -14 | -14.00 | 47.72 | 81.50 | 103.71 | 119.01 | 135.91 | 153.77 | 172.12 | 190.64 |
| | -9 | -9.00 | 50.40 | 83.49 | 105.37 | 120.48 | 137.22 | 154.92 | 173.13 | 191.54 |
| | -5 | -5.00 | 52.60 | 85.15 | 106.75 | 121.71 | 138.30 | 155.88 | 173.98 | 192.29 |
| | -2 | -2.00 | 54.29 | 86.42 | 107.82 | 122.67 | 139.14 | 156.62 | 174.64 | 192.87 |
| | 0 | 0.00 | 55.43 | 87.28 | 108.55 | 123.31 | 139.72 | 157.13 | 175.09 | 193.27 |
| | 2 | 2.00 | 56.59 | 88.16 | 109.29 | 123.97 | 140.30 | 157.65 | 175.54 | 193.68 |
| | 5 | 5.00 | 58.35 | 89.50 | 110.42 | 124.98 | 141.20 | 158.44 | 176.24 | 194.30 |
| | 9 | 9.00 | 60.73 | 91.33 | 111.97 | 126.37 | 142.43 | 159.53 | 177.21 | 195.16 |
| | 14 | 14.00 | 63.79 | 93.69 | 113.97 | 128.17 | 144.03 | 160.94 | 178.47 | 196.28 |
| | 20 | 20.00 | 67.56 | 96.62 | 116.47 | 130.42 | 146.03 | 162.73 | 180.05 | 197.69 |
| | 26 | 26.00 | 71.43 | 99.67 | 119.08 | 132.77 | 148.13 | 164.60 | 181.72 | 199.17 |

IN CASE OF
EXPRESSION 1     $z = \sqrt[4]{cx - (y+273.15)^4} - 273.15$

INCREASING PRECISION OF TABLE OF ONLY AREA
WHERE HIGH PRECISION IS REQUIRED

| THERMO-COUPLE INPUT TEMPERATURE z[°C] | | THERMO-COUPLE OUTPUT x[V] | | | | | | | | |
|---|---|---|---|---|---|---|---|---|---|---|
| | | 0 | 0.015 | 0.022 | 0.024 | 0.025 | 0.026 | 0.028 | 0.035 | 0.048 |
| SURROUNDING TEMPERATURE y[°C] | -20 | -20.00 | 88.77 | 117.32 | 124.43 | 127.85 | 131.18 | 137.61 | 158.01 | 189.63 |
| | -14 | -14.00 | 90.88 | 119.01 | 126.03 | 129.40 | 132.70 | 139.05 | 159.26 | 190.64 |
| | -3 | -3.00 | 95.03 | 122.35 | 129.20 | 132.50 | 135.72 | 141.94 | 161.76 | 192.68 |
| | -2 | -2.00 | 95.43 | 122.67 | 129.50 | 132.79 | 136.01 | 142.21 | 162.00 | 192.87 |
| | -1 | -1.00 | 95.83 | 122.99 | 129.81 | 133.09 | 136.30 | 142.49 | 162.24 | 193.07 |
| | 0 | 0.00 | 96.23 | 123.31 | 130.12 | 133.39 | 136.59 | 142.78 | 162.49 | 193.27 |
| | 1 | 1.00 | 96.64 | 123.64 | 130.43 | 133.70 | 136.89 | 143.06 | 162.74 | 193.47 |
| | 2 | 2.00 | 97.05 | 123.97 | 130.74 | 134.01 | 137.19 | 143.35 | 162.99 | 193.68 |
| | 3 | 3.00 | 97.46 | 124.31 | 131.06 | 134.32 | 137.49 | 143.64 | 163.24 | 193.88 |
| | 8 | 8.00 | 99.57 | 126.02 | 132.69 | 135.91 | 139.05 | 145.12 | 164.53 | 194.94 |
| | 16 | 16.00 | 103.10 | 128.91 | 135.44 | 138.59 | 141.67 | 147.64 | 166.73 | 196.74 |
| | 26 | 26.00 | 107.79 | 132.77 | 139.12 | 142.19 | 145.19 | 151.01 | 169.69 | 199.17 |

HERE, CONSTANT c IS DEFINED AS 8.7E + 11

AREA WHERE HIGH PRECISION IS REQUIRED

IN CASE OF EXPRESSION 1 $z=\sqrt[4]{cx-(y+273.15)^4}-273.15$

| THERMO-COUPLE INPUT TEMPERATURE $z[°C]$ | | THERMO-COUPLE OUTPUT $x[V]$ | | | | | | | | |
|---|---|---|---|---|---|---|---|---|---|---|
| | | 0 | 0.007 | 0.013 | 0.018 | 0.022 | 0.027 | 0.033 | 0.04 | 0.048 |
| SURROUNDING TEMPERATURE $y[°C]$ | -20 | -20.00 | 44.62 | 79.22 | 101.81 | 117.32 | 134.43 | 152.47 | 170.98 | 189.63 |
| | -14 | -14.00 | 47.72 | 81.50 | 103.71 | 119.01 | 135.91 | 153.77 | 172.12 | 190.64 |
| | -9 | -9.00 | 50.40 | 83.49 | 105.37 | 120.48 | 137.22 | 154.92 | 173.13 | 191.54 |
| | -5 | -5.00 | 52.60 | 85.15 | 106.75 | 121.71 | 138.30 | 155.88 | 173.98 | 192.29 |
| | -2 | -2.00 | 54.29 | 86.42 | 107.82 | 122.67 | 139.14 | 156.62 | 174.64 | 170.71 |
| | 0 | 0.00 | 55.43 | 87.28 | 108.55 | 123.31 | 139.72 | 157.13 | 175.09 | 171.17 |
| | 2 | 2.00 | 56.59 | 88.16 | 109.29 | 123.97 | 140.30 | 157.65 | 175.54 | 171.64 |
| | 5 | 5.00 | 58.35 | 89.50 | 110.42 | 124.98 | 141.20 | 158.44 | 176.24 | 172.36 |
| | 9 | 9.00 | 60.73 | 91.33 | 111.97 | 126.37 | 142.43 | 159.53 | 156.82 | 173.35 |
| | 14 | 14.00 | 63.79 | 93.69 | 113.97 | 128.17 | 144.03 | 160.94 | 158.26 | 174.64 |
| | 20 | 20.00 | 67.56 | 96.62 | 116.47 | 130.42 | 146.03 | 144.25 | 160.07 | 151.25 |
| | 26 | 26.00 | 71.43 | 99.67 | 119.08 | 117.63 | 131.46 | 146.38 | 139.12 | 139.12 |

HERE, CONSTANT c IS DEFINED AS 8.7E + 11

VARIATION OF LOCAL DATA

VARIATION OF LOCAL DATA

- 150.00–200.00
- 100.00–150.00
- 50.00–100.00
- 0.00–50.00
- -50.00–0.00

IN CASE OF EXPRESSION 1  $z = \sqrt[4]{cx - (y+273.15)^4} - 273.15$

| THERMO-COUPLE INPUT TEMPERATURE z[°C] | | THERMO-COUPLE OUTPUT x[V] | | | | | | | |
|---|---|---|---|---|---|---|---|---|---|
| | | 0 | 0.007 | 0.013 | 0.018 | 0.022 | 0.027 | 0.033 | 0.04 | 0.048 |
| SURROUNDING TEMPERATURE y[°C] | -20 | -20.00 | 44.62 | 79.22 | 101.81 | 117.32 | 134.43 | 152.47 | 170.98 | 189.63 |
| | -14 | -14.00 | 47.72 | 81.50 | 103.71 | 119.01 | 135.91 | 153.77 | 172.12 | 190.64 |
| | -9 | -9.00 | 50.40 | 83.49 | 105.37 | 120.48 | 137.22 | 154.92 | 173.13 | 191.54 |
| | -5 | -5.00 | 52.60 | 85.15 | 106.75 | 121.71 | 138.30 | 155.88 | 173.98 | 192.29 |
| | -2 | -2.00 | 54.29 | 86.42 | 107.82 | 122.67 | 139.14 | 156.62 | 174.64 | 192.87 |
| | 0 | 0.00 | 55.43 | 87.28 | 108.55 | 123.31 | 139.72 | 157.13 | 175.09 | 193.27 |
| | 2 | 2.00 | 56.59 | 88.16 | 109.29 | 123.97 | 140.30 | 157.65 | 175.54 | 193.68 |
| | 5 | 5.00 | 58.35 | 89.50 | 110.42 | 124.98 | 141.20 | 158.44 | 176.24 | 194.30 |
| | 9 | 9.00 | 60.73 | 91.33 | 111.97 | 126.37 | 142.43 | 159.53 | 177.21 | 195.16 |
| | 14 | 14.00 | 63.79 | 93.69 | 113.97 | 128.17 | 144.03 | 160.94 | 178.47 | 196.28 |
| | 20 | 20.00 | 67.56 | 96.62 | 116.47 | 130.42 | 146.03 | 162.73 | 180.05 | 197.69 |
| | 26 | 26.00 | 71.43 | 99.67 | 119.08 | 132.77 | 148.13 | 164.60 | 181.72 | 199.17 |

HERE, CONSTANT c IS DEFINED AS 8.7E+11

FIG. 6(a) Prior Art

IN CASE OF EXPRESSION 2  $z = c_1 + (c_2 + c_3 x)x + (c_4 + c_5 y)y$

| THERMO-COUPLE INPUT TEMPERATURE z[°C] | | THERMO-COUPLE OUTPUT x[V] | | | | | | | |
|---|---|---|---|---|---|---|---|---|---|
| | | 0 | 0.007 | 0.013 | 0.018 | 0.022 | 0.027 | 0.033 | 0.04 | 0.048 |
| SURROUNDING TEMPERATURE y[°C] | -20 | 19.84 | 54.77 | 81.81 | 102.28 | 117.31 | 134.42 | 152.49 | 170.18 | 185.90 |
| | -14 | 21.22 | 56.15 | 83.18 | 103.66 | 118.69 | 135.80 | 153.87 | 171.55 | 187.28 |
| | -9 | 22.51 | 57.45 | 84.48 | 104.95 | 119.98 | 137.10 | 155.17 | 172.85 | 188.58 |
| | -5 | 23.64 | 58.58 | 85.61 | 106.08 | 121.11 | 138.23 | 156.30 | 173.98 | 189.71 |
| | -2 | 24.54 | 59.48 | 86.51 | 106.98 | 122.02 | 139.13 | 157.20 | 174.88 | 190.61 |
| | 0 | 25.17 | 60.11 | 87.14 | 107.61 | 122.65 | 139.76 | 157.83 | 175.51 | 191.24 |
| | 2 | 25.82 | 60.76 | 87.79 | 108.26 | 123.30 | 140.41 | 158.48 | 176.16 | 191.89 |
| | 5 | 26.84 | 61.77 | 88.80 | 109.28 | 124.31 | 141.42 | 159.49 | 177.17 | 192.90 |
| | 9 | 28.26 | 63.20 | 90.23 | 110.70 | 125.74 | 142.85 | 160.92 | 178.60 | 194.33 |
| | 14 | 30.17 | 65.10 | 92.13 | 112.61 | 127.64 | 144.75 | 162.82 | 180.50 | 196.23 |
| | 20 | 32.62 | 67.56 | 94.59 | 115.06 | 130.10 | 147.21 | 165.28 | 182.96 | 198.69 |
| | 26 | 35.27 | 70.20 | 97.24 | 117.71 | 132.74 | 149.85 | 167.92 | 185.61 | 201.33 |

HERE CONSTANT c1~c5 IS DEFINED AS    25.1736  5252.15  -37343.3  0.319593  0.0026419

FIG. 6b Prior Art

CALCULATION DEVICE AND METHOD THEREFOR

BACKGROUND OF THE INVENTION

1. Field of the Invention

The present invention relates to the technology of a calculation device and a calculation method, and more particularly to an operation device and an operation method of obtaining thermo-couple input temperature from thermo-couple output electrical potential and surrounding temperature.

2. Description of Related Art

Conventionally, the expressions of obtaining thermo-couple input temperature are given in an expression 1 (expression (1) is used hereinafter), $$Z = \sqrt[4]{c*x - (y+273.15)^4} - 273.15 \quad (1)$$

where c: constant, x: thermo-couple output, y surrounding temperature [° C.], z thermo-couple input temperature [° C.].

Further, for obtaining thermo-couple input temperature, there is a method of obtaining it by immediately calculating using the required expression (1) and a method of obtaining it by calculating using expression 2 (expression (2) is used hereinafter), $$Z = c1 + (c2 + c3*x)*x + (c4 + c5*y)*y \quad (2)$$

where

C1~c5: constant, x: thermo-couple output [V],

Y: surrounding temperature [° C.], z: thermo-couple input temperature [° C.], which is an approximate expression of the expression (1).

Here, FIGS. 6 and 7 are simulation results in which calculations are performed using the expression (1) and the expression (2) in the lower frequency of 520 kHz of the high speed clock. FIG. 7 is a graph of the simulation results expressed in FIG. 6. However, in the conventional calculation method, in order to calculate the expression (1), it is required to perform multiplication/division calculation thrice, adding/subtraction calculation thrice, and square root calculation twice. Here, for each individual calculation, multiplication/division calculation requires 17 msec, adding/subtraction calculation requires 0.4 msec, and square root calculation requires 25 msec. Namely, in order to calculate the expression (1), total calculation requires 102.2 msec. Here, according to the expression (1), in the case where thermo-couple output electrical potential is 0.02 [V] and the surrounding temperature is 18 [° C.], thermo-couple input temperature is 122.83 [° C.].

On the other hand, in order to calculate the expression (2), it is required to perform multiplication/division calculation thrice, adding/subtraction calculation thrice, and square root calculation twice. Namely, in order to calculate the expression (2), total calculation requires 69.2 msec. Here, according to the expression (2), in the case where thermo-couple output electrical potential is 0.02 [V] and the surrounding temperature is 18 [° C.], thermo-couple input temperature is 121.89 [° C.].

In this way, when calculation is performed using the expression (1), calculation requires 102.2 msec, although the value of thermo-couple input temperature that is required is accurate. On the other hand, when calculation is performed using the expression (2), the result of calculation becomes 121.89 [° C.] by causing an error of 0.94 [° C.] from the expression (1) although calculation requires 69.2 msec by a reduction of 33 msec.

Namely, the time for calculation becomes long although the result of the calculation is accurate when the expression (1) is calculated, and the result of the calculation causes an error although the time for the calculation becomes short when the expression (2) is calculated.

The purpose of the present invention is to provide a calculation device and a calculation method in which the error caused in the results of the calculation is reduced as much as possible and the time for calculation is small.

SUMMARY OF THE INVENTION

The summary of representatives is explained in the following based on the inventions disclosed in the present application.

A calculation device of the present invention, in which thermo-couple input temperature is calculated from thermo-couple output electrical potential and the surrounding temperature, includes a memory for storing a plurality of values of thermo-couple input temperature being calculated using a plurality of values of thermo-couple output electrical potential and a plurality of values of surrounding temperature; and a calculation unit for inputting a predetermined value of thermo-couple output electrical potential and a predetermined value of surrounding temperature, reading out from the memory a plurality of values of stored thermo-couple output electrical potential corresponding to a predetermined value of inputted thermo-couple output electrical potential, reading out from the memory a plurality of values of stored surrounding temperature corresponding to a predetermined value of inputted surrounding temperature, reading out from the memory a plurality of values of stored thermo-couple input temperature selected from a plurality of values of read out thermo-couple output electrical potential and a plurality of values of read out surrounding temperature, and calculating thermo-couple input temperature corresponding to a predetermined value of inputted surrounding temperature and a predetermined value of inputted thermo-couple output electrical potential using an interpolation.

In accordance with the above-described system arrangements, it is possible to reduce an error caused in the results of calculation as much as possible and shorten the time for calculation as much as possible.

BRIEF DESCRIPTION OF THE DRAWINGS

While the specification concludes with claims particularly pointing out and distinctly claiming the subject matter which is regarded as the invention, it is believed that the invention, the object, features and advantages thereof will be better understood from the following description taken in connection with the accompanying drawings in which:

FIG. 6 shows simulation results in which calculation is performed using expressions (1) and (2) with the lower frequency of 520 kHz of the fast clock.

DETAILED DESCRIPTION OF THE INVENTION

The invention will now be described based on the preferred embodiments. This does not intend to limit the scope of the present invention, but rather exemplify the invention. All of the features and the combinations thereof described in the embodiments are not necessarily essential to the invention.

In the following, the embodiment of the present invention is explained in detail with reference to the drawings. Here, in all drawings for explaining the embodiments of the present invention, the same reference number is used to the element having the same function, thus repetitive explanation is omitted.

First Preferred Embodiment

Figure 1:
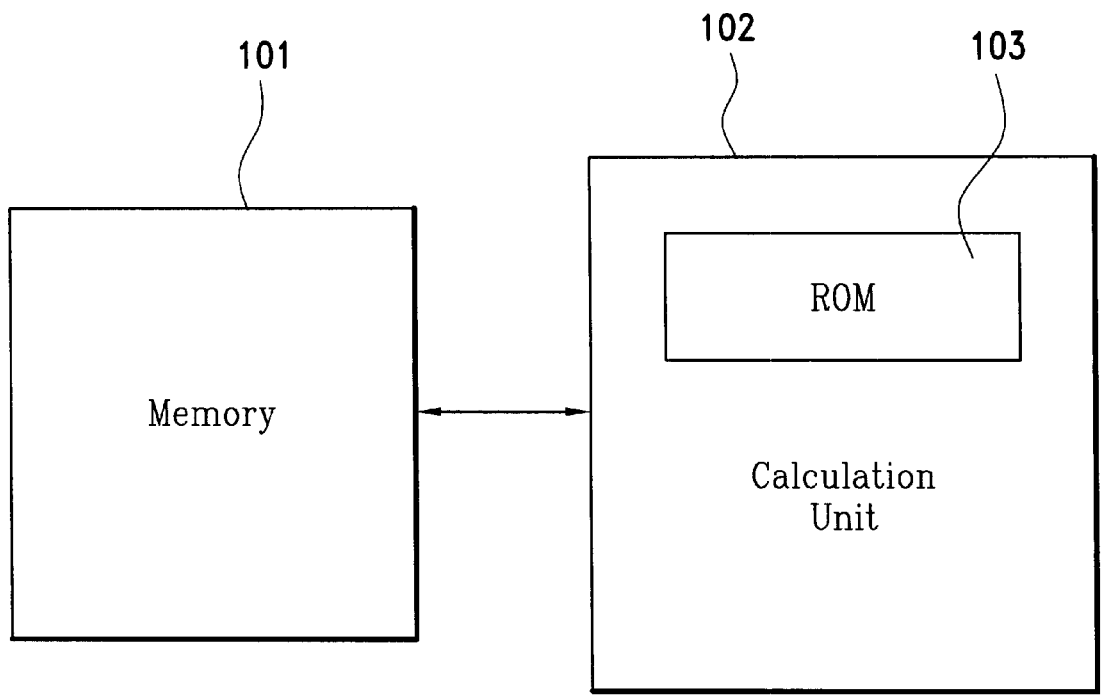
FIG. 1 is a system diagram of a calculation device of the first preferred embodiment of the present invention.
Figure 2:
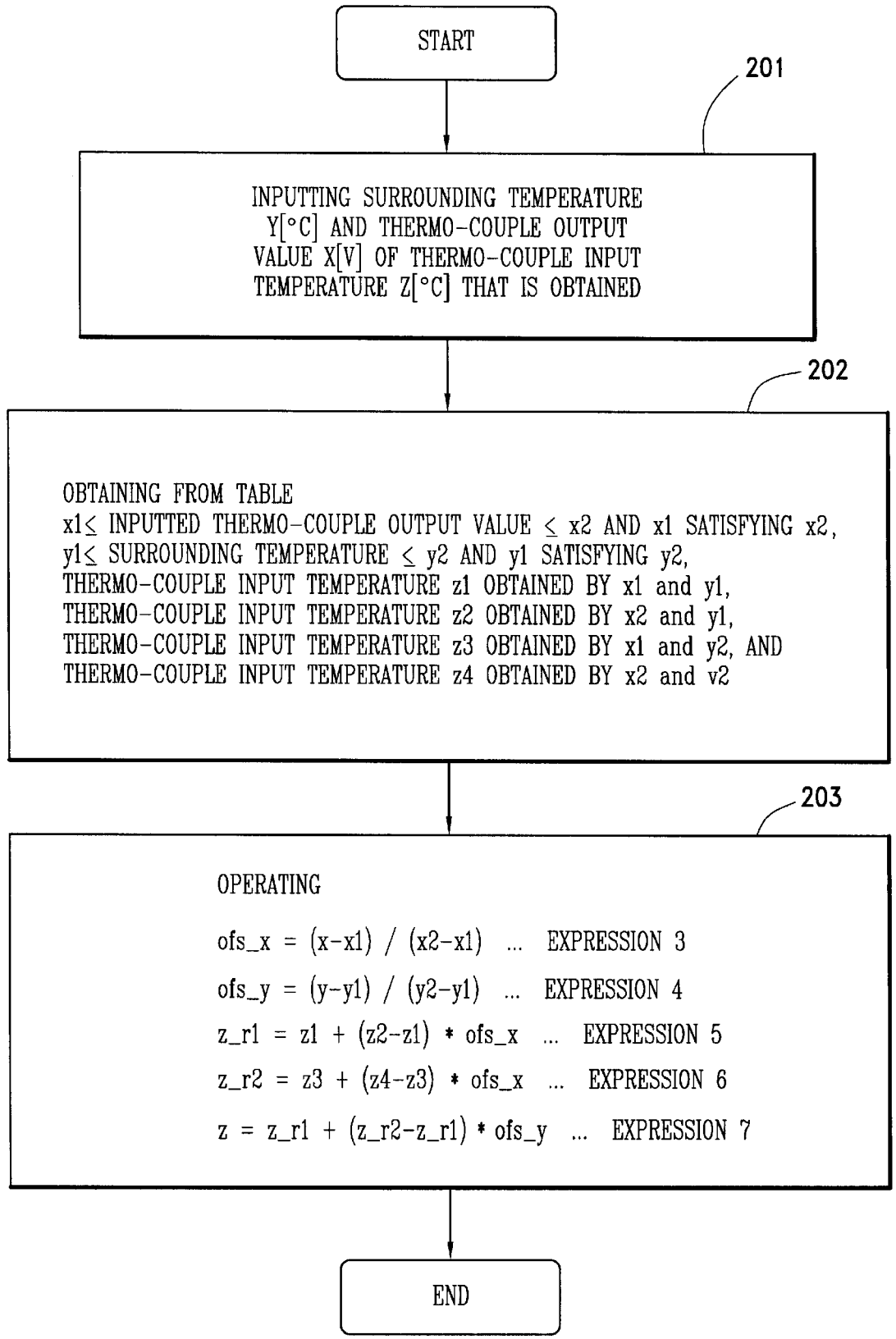
FIG. 2 is a flowchart of calculation procedures of the first preferred embodiment of the present invention.
Figure 3:
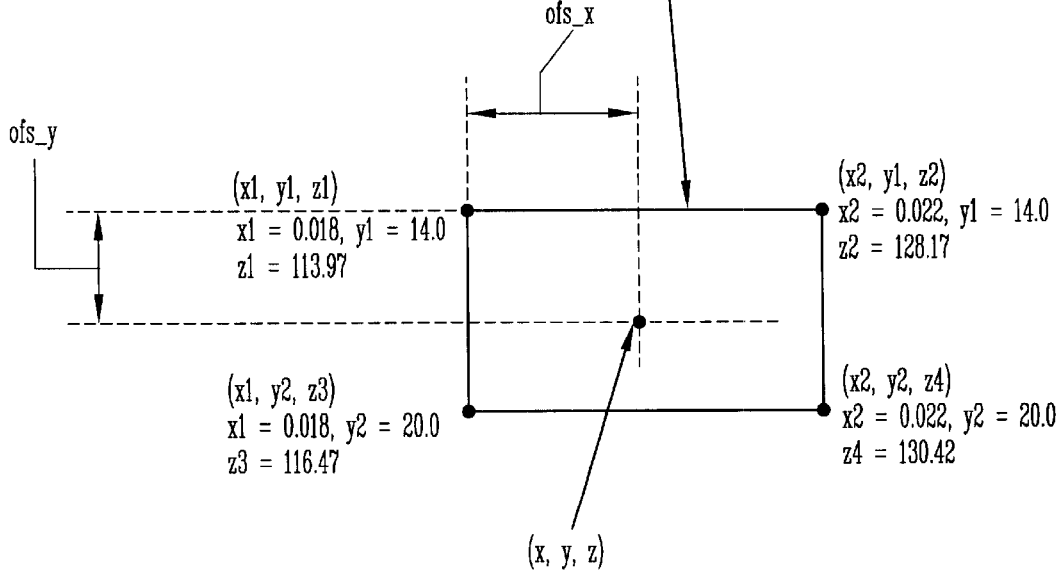
FIG. 3 is a conceptual drawing of calculation procedures of the first preferred embodiment of the present invention.

FIGS. 1 to 3 show a calculation device and a calculation method of the first preferred embodiment of the present invention. FIG. 1 is a system block diagram of the calculation device of the first preferred embodiment of the present invention. FIG. 2 is a flowchart of a calculation procedure of the first preferred embodiment of the present invention. FIG. 3 is a conceptual view showing the calculation procedure of the first preferred embodiment of the present invention.

First of all, the calculation device of the first preferred embodiment of the present invention is explained with reference to FIG. 1. The calculation device of the first preferred embodiment of the present invention includes a memory device 101 ("memory 101" is used hereinafter) having EEPROM, etc. and a calculation unit 102 for calculating a thermo-couple input temperature. Here, the calculation unit 102 includes a ROM 103 for storing procedures for calculating the thermo-couple input temperature.

The memory 101 calculates using the expression (1) from thermo-couple output electrical potential x and a surrounding temperature y as indicated in FIG. 6A, and then stores a thermo-couple input temperature z thus calculated as a table format. In the memory 101, thermo-couple output electrical potential x, the surrounding temperature y, and thermo-couple input temperature z are stored. Further, the thermo-couple input temperature z is accessed by two values of thermo-couple output electrical potential x and the surrounding temperature y.

In the ROM 103, expressions 3 to 7 ("expressions (3) to (7)" are used hereinafter) are programmed and stored.

$$ofs\_x = (x-x1)/(x2-x1) \quad (3)$$

$$ofs\_y = (y-y1)/(y2-y1) \quad (4)$$

$$z\_r1 = z1 + (z2-z1)*ofs\_x \quad (5)$$

$$z\_r2 = z3 + (z4-z3)*ofs\_x \quad (6)$$

$$z = z\_r1 + (z\_r2-z\_r1)*ofs\_y \quad (7)$$

Stored programs are read out by an indication of the calculation unit 102.

Next, the calculation method of the first preferred embodiment of the present invention is explained with reference to FIGS. 2 and 3. Here, as an example, the case in which thermo-couple output electrical potential x is obtained for thermo-couple output electrical potential of 0.02 [V] and the surrounding temperature of 18 [° C.], is explained.

First of all, at a step 201, the calculation unit 102 inputs the surrounding temperature y (=18.0) and the thermo-couple output electrical potential x (=0.02) corresponding to the thermo-couple input temperature z.

Next, at a step 202, the calculation unit 102 selects values of x1 and x2 which are the closest to inputted thermo-couple output electrical potential x and satisfies "x1≦inputted thermo-couple output electrical potential x≦x2" from the memory 101 in which the calculation results of expression (1) are stored in the table format. That is to say, values of x1 and x2, which are the closest to values of inputted thermo-couple output electrical potential x, are selected from the memory 101. In this embodiment, the calculation unit 102 selects 0.018 as x1 and 0.022 as x2, but does not select 0.013 as x1 and 0.027 as x2. Because, when 0.013 as x1 and 0.027 as x2 are selected, the inaccuracy of the thermo-couple input temperature z, which should be obtained, becomes large, compared with the case of selecting 0.018 as x1 and 0.022 as x2.

In the same way, the calculation unit 102 selects values of y1 and y2, which are the closest to the inputted surrounding temperature y, and satisfies "y1≦inputted surrounding temperature y≦y2." That is to say, values of y1 and y2, which are the closest to the inputted surrounding temperature y, are selected from the memory 101. In this embodiment, the calculation unit 102 selects 14.0 as y1 and 20.0 as y2 from the memory 101, but does not select 9.0 as y1 and 26.0 as y2. Because, when 9.0 as y1 and 26.0 as y2 are selected, the inaccuracy of the thermo-couple input temperature z, which should be obtained, becomes large, compared with the case of selecting 14.0 as y1 and 20.0 as y2.

Next, the calculation unit 102 selects the thermo-couple input temperature z1 (=113.97) corresponding to selected x1 (=0.0018) and y1 (14.0) from a table of the memory 101. In the same way, the calculation unit 102 selects the thermo-couple input temperature z2 (=128.17) corresponding to selected x2 (=0.022) and y1 (=14.0), the thermo-couple input temperature z3 (=116.47) corresponding to selected x1 (=0.018) and y2 (=20.0), and the thermo-couple input temperature z4 (=130.42) corresponding to selected x2 (=0.022) and y2 (=20.0) from the table of the memory 101.

Next, at a step 203, the calculation unit 102 calculates the expression (3) and obtains a fluctuation rate ofs_x (=0.5) of thermo-couple output electrical potential using inputted thermo-couple output electrical potential x (=0.02) and selected thermo-couple output electrical potential x1 (=0.018) and x2 (=0.022).

Next, the calculation unit 102 calculates the expression (4) and obtains a fluctuation rate ofs_y (=0.6667) of the surrounding temperature using the inputted surrounding temperature y (=18.0) and the surrounding temperature y1 (=14.0) and y2 (=20.0).

Next, the calculation unit 102 calculates the expression (5) using the selected thermo-couple input temperature z1 (=113.97) and z2 (=128.17) and the calculated fluctuation rate ofs_x (=0.5) of the thermo-couple output electrical potential. Further, the first forecast thermo-couple input temperature z_r1 (=121.07) of the fluctuation rate of thermo-couple output electrical potential to the surrounding temperature y1 (=14.0 is obtained.

Next, the calculation unit 102 calculates the expression (6) using the selected thermo-couple input temperature z3

(=116.47) and z4 (=130.42) and the calculated fluctuation rate ofs_x (=0.5) of the thermo-couple output electrical potential. Further, the second forecast thermo-couple input temperature z_r2=123.445) of the fluctuation rate of the thermo-couple output electrical potential to the surrounding temperature y2 (=20.0) is obtained.

Next, the calculation unit 102 calculates the expression (7) using the calculated first forecast thermo-couple temperature z_r1 (=121.07), the calculated second forecast thermo-couple input temperature z_r2 (=123.445), and the calculated fluctuation rate ofs_y (=0.6667) of the surrounding temperature. Then, the thermo-couple input temperature z (=122.653) is obtained.

In accordance with the calculation device and the calculation method of the first preferred embodiment of the present invention, the following advantageous results are obtained.

(1) In the first preferred embodiment of the present invention, when expression (3) to expression (7) are calculated, multiplication/division calculation is performed five times and adding/subtraction calculation is performed ten times, and square root calculation is performed ten times. Here, if multiplication/division calculation requires 17 msec and adding/subtraction calculation requires 0.4 msec in order to perform each individual calculation, total calculation requires 89 msec. Namely, the calculation of the first preferred embodiment of the present invention reduces 13 msec of the calculation time, compared with the calculation of the conventional expression (1) Further, the result of the calculation of the first preferred embodiment of the present invention is 122.653 [° C.], and the error thereof is only 0.177 [° C.], compared with the result (122.83 [° C.]) of the calculation of conventional expression (1). This is a great improvement, compared with the error (0.94 [° C.]) of the result of the calculation between the conventional expression (1) and the conventional expression (2).

(2) Further, when both of the inputted thermo-couple output electrical potential x and the inputted surrounding temperature y are in the memory 101, it is possible to obtain the thermo-couple input temperature z from the memory 101 without performing the above-mentioned step 3. In this case, it is possible to reduce the calculation time for obtaining the thermo-couple input temperature z since it can be reduced to perform the step 3.

(3) In the calculation device of the first preferred embodiment of the present invention, the result, which is obtained by calculating a function for obtaining the thermo-couple input temperature z from the thermo-couple output electrical potential x and the surrounding temperature y, is stored in a readable and writable memory device. Thus, in the case where it is required to change the function corresponding to applications, it is enough to alter data stored in the memory device, but it is not required to alter the calculation device. Further, products adopting the present invention can rewrite data by on-board even if manufacturing has finished.

Second Preferred Embodiment

Figures 4A, 4B:
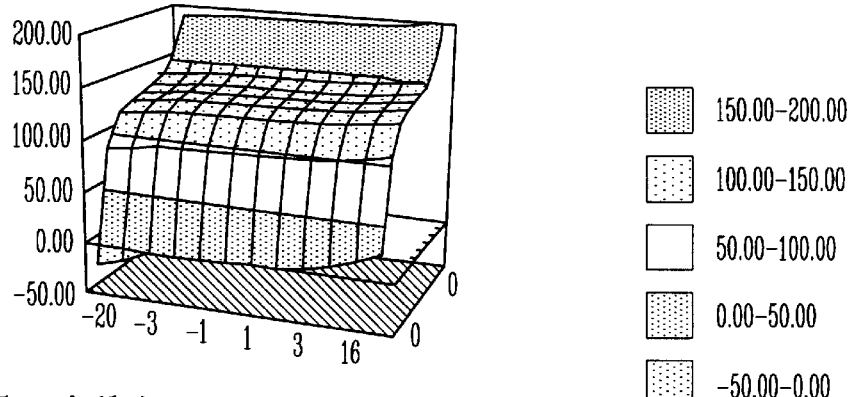
FIGS. 4A and 4B are a conceptual drawing and a graph, respectively, of calculation procedures of the second preferred embodiment of the present invention.

FIG. 4 is a view for the calculation method and the calculation device of the second preferred embodiment of the present invention. FIG. 4A is a conceptual view showing the calculation procedures of the second preferred embodiment of the present invention. FIG. 4B is a graph of the table FIG. 4A.

In the calculation method and the calculation device of the second preferred embodiment of the present invention, the memory 101, as shown in FIG. 4A, calculates using the expression (1) using the thermo-couple output electrical potential x and the surrounding temperature y, and stores obtained the thermo-couple input temperature z in the table format. In the table used in the second preferred embodiment of the present invention, only the area where a highly resolved operation is required is calculated in detail. Namely, in the area where the highly resolved operation is required, it is stored in the memory 101 in the table format by subdividing the range of the thermo-couple output electrical potential x and the surrounding temperature y and by obtaining the thermo-couple input temperature z corresponding thereto.

In accordance with the calculation method and the calculation device of the second preferred embodiment of the present invention, the following effects are obtained, in addition to the effects (1) to (3) which can be obtained by the calculation method and the calculation device of the second preferred embodiment of the present invention.

(4) In the calculation method and the calculation device, in the area where high resolution is required, it is possible to obtain a highly resolved thermo-couple input temperature. Further, for the area, except for the area where the high resolution is required, it is possible to save the capacity of the memory 101 by setting a rough setting.

Third Preferred Embodiment

Figures 5A, 5B:
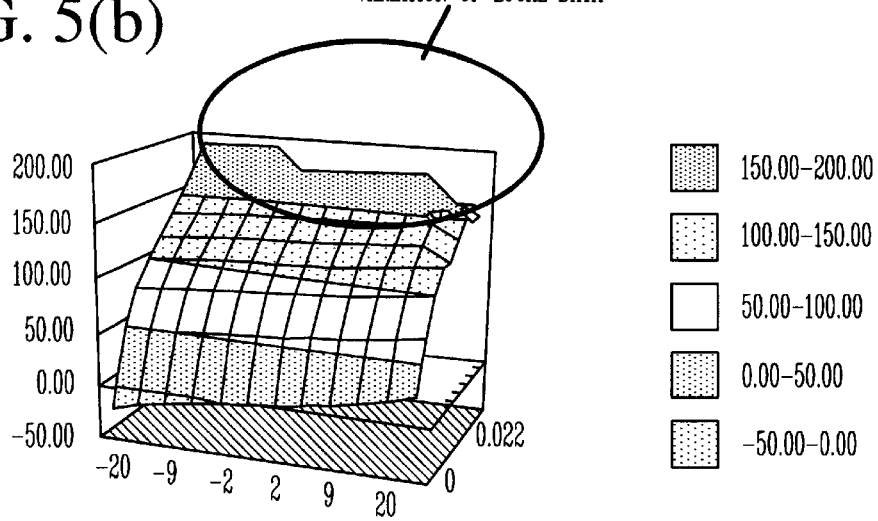
FIGS. 5A and 5B are a conceptual drawing and a graph, respectively, of calculation procedures of the third preferred embodiment of the present invention.
Figure 7A:
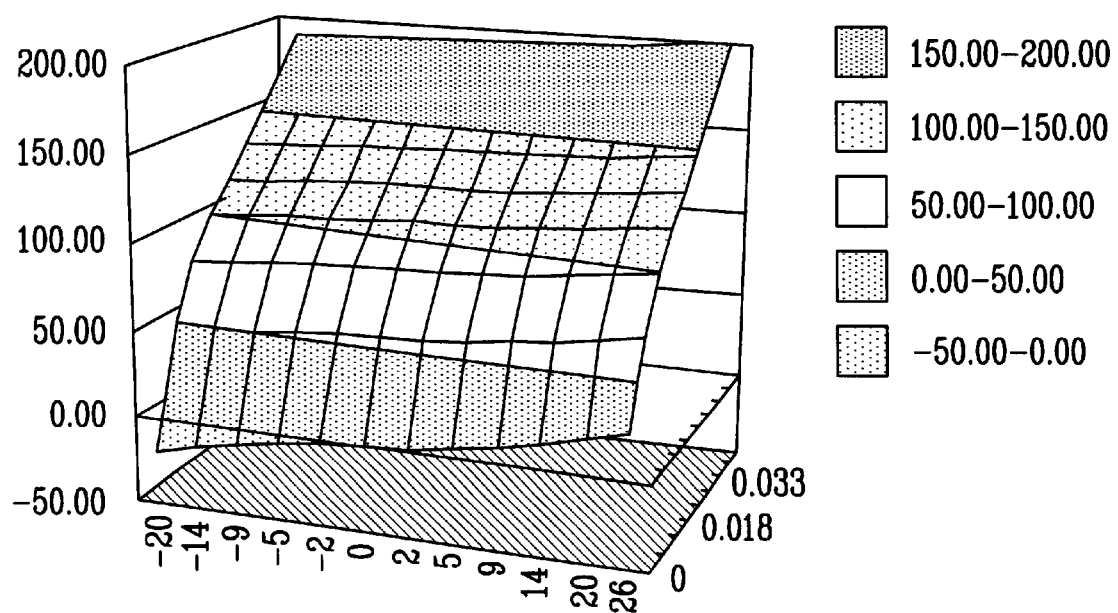
FIGS. 7A and 7B are graphs showing the simulation results described in FIG. 6.
Figure 7B:
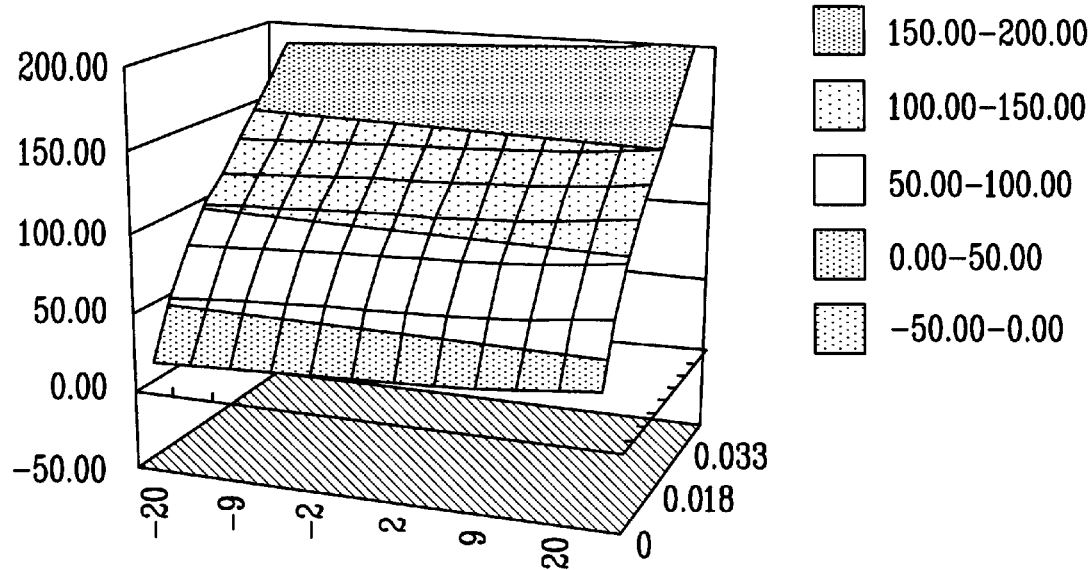

FIG. 5 is a view showing the calculation method and the calculation device of the third preferred embodiment of the present invention. FIG. 5A is a conceptual view showing the calculation procedures of the third preferred embodiment of the present invention. FIG. 5B is a graph of the table of FIG. 5A.

In the calculation method and the calculation device of the third preferred embodiment of the present invention, the memory 101, as shown in FIG. 5A, calculates using the expression (1) using the thermo-couple output electrical potential x and the surrounding temperature y, and stores obtained the thermo-couple input temperature z in the table format. In the table used in the third preferred embodiment of the present invention, in addition to the table shown in the first preferred embodiment and the second preferred embodiment, the thermo-couple input temperature z of the area where the error is caused severely is stored. Namely, the thermo-couple input temperature z of the area where the error becomes large is obtained in advance, and then it is stored in the memory 101 in the table format.

In accordance with the third preferred embodiment of the present invention, in addition to the effects (1) to (3) obtained in the calculation method and the calculation device of the first preferred embodiment of the present invention, the following advantageous effects are obtained.

(5) By storing the area where the error is caused severely in the memory in advance by formatting in the table, it is avoidable to calculate in the area thereof and then to cause the error. Further, it is possible to shorten the calculation time for obtaining the thermo-couple input temperature z.

Thus, the invention invented by the present inventor has been explained in a concrete manner based on the preferred embodiments, the present invention is not limited to the above-described preferred embodiment, but it goes without saying that various modifications are possible within the scope of the spirit of the subject matter.

The advantageous effect, which is obtained by the representative embodiment of the invention disclosed in the present application, is explained in the following.

In accordance with the present invention, the calculation time for obtaining the thermo-couple input temperature is reduced, and further the calculation precision is enhanced.

What is claimed is:

1. A calculation device, wherein a solution Z is calculated using a variable X and a variable Y, comprising:
- a memory for storing a plurality of solutions Z being calculated using a plurality of values of said variable X and a plurality of values of said variable Y; and
- a calculation unit for inputting a predetermined value of said variable X and a predetermined value of said variable Y, reading, out from said memory a plurality of values of the stored variable X corresponding to the predetermined value of the inputted variable X, reading out from the memory a plurality of values of the stored variable Y corresponding to the predetermined value of the inputted variable Y, reading out from the memory a plurality of said stored solutions Z corresponding to the plurality of values of the read out variable X and the plurality of values of the read out variable Y, and calculating the solutions Z corresponding to the predetermined value of the inputted variable Y and the predetermined value of the inputted variable X using interpolation;
- wherein the plurality of values of the stored variable X read our of the memory includes at least a first value of the variable X smaller than the predetermined value of the inputted variable X and a second value of the variable X larger than the predetermined value of the inputted variable X, and the plurality of values of the stored variable Y read out of the memory includes at least a first value of the variable Y smaller than the predetermined value of the inputted variable Y and a second value of the variable Y larger than the predetermined value of the inputted variable Y.

2. A calculation device according to claim 1, wherein the plurality of solution Z stored in the memory are calculated for increments of the value of the variable X and the value of the variable Y which are not uniform, said increments being smaller over ranges of the variable X and the variable Y where greater precision in the calculated solution Z, corresponding to the predetermined value of inputted variable X and the predetermined value of the inputted variable Y, is required.

3. A calculation device according to claim 1, wherein the interpolation is a linear interpolation.

4. A calculation device according to claim 1, wherein the plurality of values of the variable X read out of the memory is two in number, the plurality of values of the variable Y read out of the memory is two in number, and the plurality of the stored solutions Z corresponding to the plurality of values of the read out variable X and the plurality of values of the read out variable Y, is four in number.

5. A calculation device, wherein thermo-couple input temperature is calculated from thermo-couple output electrical potential and surrounding temperature, comprising:
- a memory for storing a plurality of values of said thermo-couple input temperature being calculated using a plurality of values of said thermo-couple output electrical potential and a plurality of values of said surrounding temperature; and
- a calculation unit for inputting a predetermined value of said thermo-couple output electrical potential and a predetermined value of said surrounding temperature, reading out from the memory a plurality of values of said stored thermo-couple output electrical potential corresponding to the predetermined value of said inputted thermo-couple output electrical potential, reading out from the memory a plurality of values of said stored surrounding temperature corresponding to the predetermined value of said inputted surrounding temperature, reading out from the memory a plurality of values of said stored thermo-couple input temperature corresponding to the plurality of values of said read out thermo-couple output electrical potential and the plurality of values of said read out surrounding temperature, and calculating thermo-couple input temperature corresponding to the predetermined value of said inputted surrounding temperature and the predetermined value of said inputted thermo-couple output electrical potential using interpolation;
- wherein said calculation unit:
  - compares said stored thermo-couple output electrical potential with the predetermined value of said inputted thermo-couple output electrical potential, reads out from the memory said stored thermo-couple output electrical potential, which is smaller than the predetermined value of said inputted thermo-couple output electrical potential, as a first thermo-couple output electrical potential, and reads out from the memory said stored thermo-couple output electrical potential, which is larger than the predetermined value of said inputted thermo-couple output electrical potential, as a second thermo-couple output electrical potential;
  - compares the predetermined value of said inputted surrounding temperature with said stored surrounding temperature, reads out from the memory said stored surrounding temperature, which is smaller than the predetermined value of said inputted surrounding temperature, as a first surrounding temperature, and reads out from the memory said stored surrounding temperature, which is larger than the predetermined value of said inputted surrounding temperature, as a second surrounding temperature;
  - reads out from the memory a plurality of values of said stored thermo-couple input temperature, corresponding to said first thermo-couple output electrical potential, said first surrounding temperature, and said second surrounding temperature, as a first thermo-couple input temperature and a second thermo-couple input temperature, and reads out from the memory a plurality of values of said stored thermo-couple input temperature, corresponding to said second thermo-couple output electrical potential, said first surrounding temperature, and said second surrounding temperature, as a third thermo-couple input temperature and a fourth thermo-couple input temperature; and
  - calculates thermo-couple input temperature corresponding to the predetermined value of said inputted surrounding temperature and the predetermined value of said inputted thermo-couple output electrical potential using an interpolation.

6. A calculation device according to claim 5, wherein the plurality of values of the thermo-couple input temperature stored in the memory are calculated for increments of the value of the thermo-couple output electrical potential and the value of the surrounding temperature which are not uniform, said increments being smaller over ranges of the thermo-couple output electrical potential and the surrounding temperature where greater precision in the calculated thermocouple input temperature, corresponding to the predetermined value of inputted surrounding temperature and the predetermined value of the inputted thermo-couple output electrical potential, is required.

7. A calculation method wherein thermo-couple input temperature is calculated using thermo-couple output electrical potential and surrounding temperature, comprising the steps of:

storing in a memory a plurality of values of said thermo-couple input temperature calculated using a plurality of values of said thermo-couple output electrical potential and a plurality of values of said surrounding temperature;

inputting a predetermined value of said thermo-couple output electrical potential and a predetermined value of said surrounding temperature;

comparing a predetermined value of said inputted thermo-couple output electrical potential with said stored thermo-couple output electrical potential;

reading out from the memory said stored thermo-couple output electrical potential, which is smaller than a predetermined value of said inputted thermo-couple output electrical potential, as a first thermo-couple output electrical potential;

reading out from the memory said stored thermo-couple output electrical potential, which is larger than a predetermined value of said inputted thermo-couple output electrical potential, as a second thermo-couple output electrical potential;

comparing a predetermined value of said inputted surrounding temperature with said stored surrounding temperature;

reading out from the memory said stored surrounding temperature, which is smaller than a predetermined value of said inputted surrounding temperature, as a first surrounding temperature;

reading out from the memory said stored surrounding temperature, which is larger than a predetermined value of said inputted surrounding temperature, as a second surrounding temperature;

reading out from the memory said stored thermo-couple input temperature, corresponding to said first thermo-couple output electrical potential, said first surrounding temperature, and said second surrounding temperature, as first thermo-couple input temperature and a second thermo-couple input temperature;

reading out from the memory said stored thermo-couple input temperature, corresponding to said second thermo-couple output electrical potential, said first surrounding temperature, and said second surrounding temperature, as third thermo-couple input temperature and fourth thermo-couple input temperature; and calculating thermo-couple input temperature, corresponding to a predetermined value of said inputted surrounding temperature and a predetermined value of said inputted thermo-couple output electrical potential by an interpolation, using a predetermined value of said inputted thermo-couple output electrical potential, a predetermined value of said inputted surrounding temperature, said read out first and second thermo-couple output electrical potential, said read out first and second surrounding temperature, and said read out first, second, third, and fourth thermo-couple input temperature.

8. A calculation method according to claim 7, wherein the plurality of values of the thermo-couple input temperature stored in the memory are calculated for increments of the value of the thermo-couple output electrical potential and the value of the surrounding temperature which are not uniform, said increments being smaller over ranges of the thermo-couple output electrical potential and the surrounding temperature where greater precision in the calculated thermocouple input temperature, corresponding to the predetermined value of inputted surrounding temperature and the predetermined value of the inputted thermo-couple output electrical potential, is required.

* * * * *